UNITED STATES PATENT OFFICE.

EDUARD ULLRICH, OF HÖCHST-ON-THE-MAIN, GERMANY, ASSIGNOR TO THE FARBWERKE, VORMALS MEISTER, LUCIUS & BRÜNING, OF SAME PLACE.

PROCESS OF DYEING QUINONIMID DYES.

SPECIFICATION forming part of Letters Patent No. 649,227, dated May 8, 1900.

Application filed April 5, 1898. Serial No. 676,570. (No specimens.)

*To all whom it may concern:*

Be it known that I, EDUARD ULLRICH, doctor of philosophy, a citizen of the Empire of Germany, residing at Höchst-on-the-Main, Germany, have invented certain new and useful improvements in processes of producing on fibers the tannin-antimony compounds of the quinonimid dyestuffs from their components, of which the following is a specification.

The production on the fiber of azo dyestuffs from their components was heretofore possible only with certain of these dyestuffs. This method was inapplicable, for the reason that certain difficulties were encountered in the formation of the dyestuff itself. This was especially the case where, in the formation of the dyestuff, it was necessary to employ heat for a considerable time in the presence of volatile solvents and condensation agents. Difficulty was also experienced with by-products produced during the formation of the dye. The production on the fiber of these impure dyestuffs, if at all possible, was attended with a partial destruction of the fiber. It was for these reasons generally considered impracticable, therefore, to produce the quinonimid dyestuffs on the fiber. I have succeeded, however, in producing on the fiber, by way of printing or dyeing, these dyestuffs in the form of their tannin-antimony compounds. It is possible to produce these dyestuffs, in the form of their tannates, on the fiber, by steaming for a very short time, (one to three minutes,) and by this process the fiber is not attacked, and, although by-products are obtained, yet they do not act upon the dyestuff on account of its being rapidly fixed, do not influence its shade, and are easily removed by the ordinary washing process.

The production of the quinonimid dyestuffs on the fiber is accomplished by preparing a printing or padding color from the two substances which are to react upon each other to form the dyestuff and adding to said two substances an organic acid, tannin, and the usual thickening agents. The material is then printed or padded with this color, passed once or more through the Mather Platt apparatus, then washed, soaped, and, if need be, treated with chlorin.

If a phenol, such as beta-naphthol, is used as one of the components, then one may proceed, instead of in the manner stated, by preparing the material with it in the usual manner and then printing or padding the material thus prepared with the printing or padding color formed from the other component. As the formation of the dyestuff takes place in an acid solution, the printing or padding colors must also be acid. The presence of the acid is also necessary to bind the alkali should the material to be printed have been prepared with naphthol-sodium. All organic acids may be employed, and even mild inorganic acids, such as boric acid. Oxalic acid is preferable on account of the short time of steaming, the cheapness of this acid, and the fact that the fiber is not corroded by its use.

For the production of the quinonimid dyestuffs on the fiber the oxazins, oxazones, and azin dyestuffs alkylated at the azin nitrogen group (azonium dyes) prove most suitable. They are formed by allowing nitroso compounds of secondary and tertiary aromatic bases to act on amins, diamins, phenols, oxycarboxylic acids, or alkylated amidophenols in molecular proportions. The products of reduction obtained from the nitroso bodies may also be oxidized with the other components, although, as a rule, with less useful results. The nitroso compounds may also be allowed to act on the dyewood extracts instead of upon the phenols to obtain the corresponding dyestuffs on the fiber.

Of the most important nitroso compounds may be mentioned nitrosodimethylanilin, nitrosodiethylanilin, nitrosoethylbenzylanilin, nitroso-ethel, or methyl-ortho-toluidin.

Of the phenols or oxycarboxylic acids are to be considered beta- and alpha- naphthol, dimethyl- or ethyl- meta-amidophenol, 2.7 and 2.6 dioxynaphthalene, dimethyl- or ethyl-meta-amidocresol, resorcinol, phenyl-meta-amidophenol, and gallic acid.

Of the amins and diamins are chiefly used naphthylamin, anilin, the xylidins, meta-amidodimethyl-para-toluidin, diphenyl-meta-phenylenediamin, and diortho-tolyl-meta-phenylenediamin.

Of the dyewood extracts, instead of phenols or mixed with them, may be employed, for instance, fustic extract, Persian-berries extract, quercitron extract, logwood extract, and prepared catechu.

Example 1: (a) Twenty grams nitrosodimethylanilin hydrochlorid are dissolved in one hundred and twenty cubic centimeters of water and the solution thickened with five hundred grams of starch-thickening acetate, with the addition of ten grams of glycerin. (b) Eighteen grams of 2.7 dioxynaphthaline are dissolved in one hundred and fifty cubic centimeters acetic acid of 60° Baumé specific gravity. (c) Ten grams of oxalic acid are mixed with one hundred cubic centimeters of water. a, b, and c are combined and mixed, with the addition of sixty grams of tannin solution, (1:1.) The printing or padding color thus prepared is of great stability when kept cool. It is printed or padded on the impregnated material, whereupon the material is dried at a low temperature of about 50° centigrade. The printed or padded material is then steamed for about two minutes in the Mather Platt apparatus and then passed through an antimony-bath to develop the tannin-antimony lakes. It is then washed, soaped, and, if required, treated with chlorin.

Example 2: (a) Twenty grams of nitroso-dimethylanilin hydrochlorid are dissolved in one hundred and thirty-two grams of water, and this solution is thickened with five hundred grams of starch-thickened acetate, with the addition of ten grams of glycerin. (b) Twenty grams of oxalic acid are mixed with two hundred and fifty-eight grams of water. a and b are combined and mixed, with the addition of sixty grams of acetate-tannin solution, (1:1.) The printing or padding color thus prepared is then printed on material prepared with beta-naphthol in the usual manner, (the percentage being a mixture of twenty-five grams of beta-naphthol, thirty-five cubic centimeters of soda-lye of 22° Baumé specific gravity, and twenty grams of ricenoleate of ammonia, made up to one liter.) The further steps in the process are the same as in Example 1.

The shades produced on the fiber are very beautiful and uniform. They may be reserved by the well-known tartar-emetic resist or by the underprint oxidation or reduction resists. They can be discharged white by employing oxidizing agents which are printed immediately after drying the printed goods, and colored discharges can be obtained by adding to the discharge-color direct-dyeing colors which withstand the oxidizing action, or colors with albumin. The exceedingly-short time of steaming which is required to produce and fix these azo dyestuffs permits the production of special effects, which could hitherto be obtained only with great difficulty with dyestuffs not produced upon the fiber and at the expense of solidity of the fiber itself.

Having thus described my invention, I claim as new and desire to secure by Letters Patent—

The process herein described of producing on the fiber the tannin-antimony compounds of the quinonimid dyestuffs from their components, which consists in printing or padding the fiber with a color containing a nitroso compound of aromatic bases, one of the phenol-like bodies hereinbefore specified, an acid, a thickening agent and tannin, then drying, steaming and passing the fiber through an antimony-bath, and washing and soaping the fiber, substantially as set forth.

In testimony that I claim the foregoing as my invention I have signed my name in presence of two subscribing witnesses.

EDUARD ULLRICH.

Witnesses:
HEINRICH HAHN,
BERNHARD LEYDECKER.